Aug. 1, 1961
L. R. TOTO
2,994,591
COMPOSTING MACHINES
Filed May 21, 1958
3 Sheets-Sheet 1
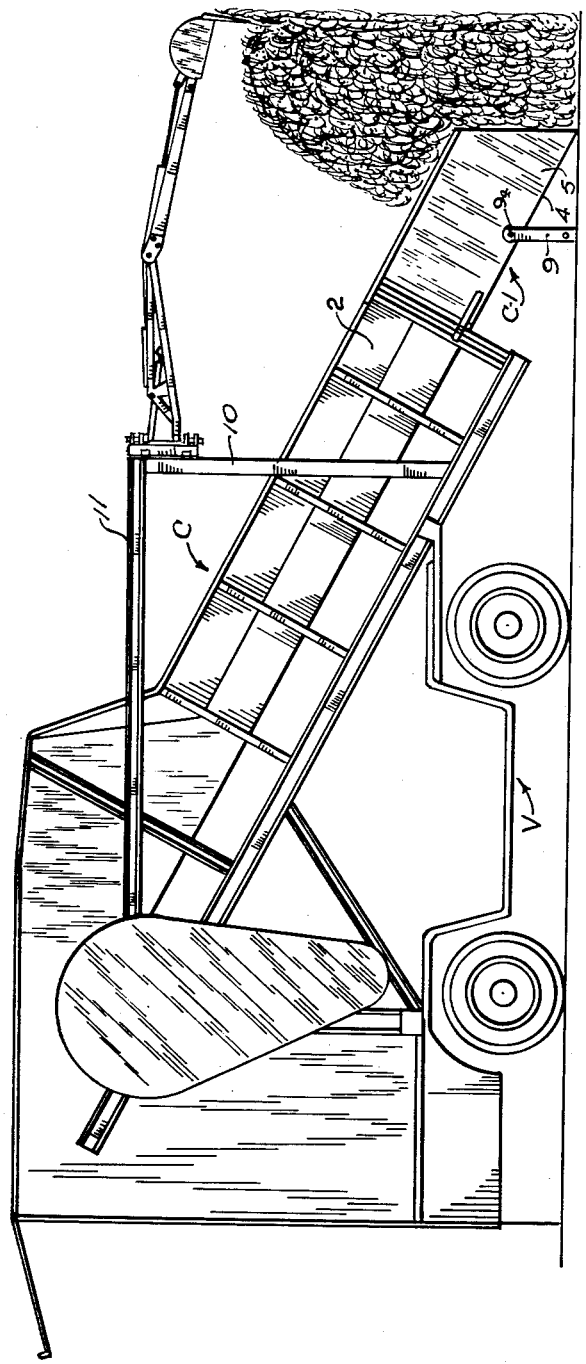
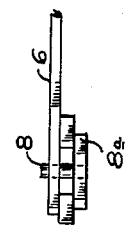
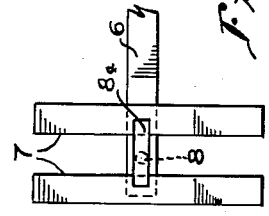
INVENTOR
Louis R. Toto
BY Ogle R. Singleton
ATTORNEY Aug. 1, 1961  L. R. TOTO  2,994,591
COMPOSTING MACHINES
Filed May 21, 1958  3 Sheets-Sheet 2

INVENTOR
Louis R. Toto
BY Ogle R. Singleton
ATTORNEY

United States Patent Office 2,994,591
Patented Aug. 1, 1961

2,994,591
COMPOSTING MACHINES
Louis R. Toto, Penn Green Farms, Landenberg, Chester County, Pa.
Filed May 21, 1958, Ser. No. 736,808
1 Claim. (Cl. 23—259.1)

My invention consists in a new and useful improvement in composting machines, and is designed more particularly to provide a machine for moving manure which has lain in piles to a beater for conditioning the manure for beds for cultivation of mushrooms.

It is the present practice to supply the manure to an upwardly travelling conveyor which discharges the manure to the beater, which beats and ejects the manure from the upper part of the rear of the machine, to be aerated and deposited in unpacked condition in piles behind the machine. Because of the matted condition of the piled up manure, which is to be treated, moving the manure into the conveyor has presented a very serious problem. My invention offers the solution of this problem.

The particularly valuable features of my improved machine are the means for breaking up the piled manure and moving it to the conveyor, the efficient means for actuating this moving means, a vehicle for moving the machine relative the piled manure, a single motor for moving the vehicle, driving the beater, the conveyor and a compressor, and a plurality of controls for all of the actuating means, which is so disposed as to be readily accessible to a single operator seated on the machine.

While I illustrate in the drawings and hereinafter fully describe one specific embodiment of my invention, it is to be distinctly understood that I do not consider my invention to be limited to said embodiment but refer for its scope to the claim appended hereto.

In the drawings:

FIG. 1 is a side elevation of my improved machine, shown operating on a pile of manure.

FIG. 2 is an enlarged, side elevation of one of the means for fastening a chute to the conveyor.

FIG. 3 is a top plan of the means of FIG. 2.

Figure 6:
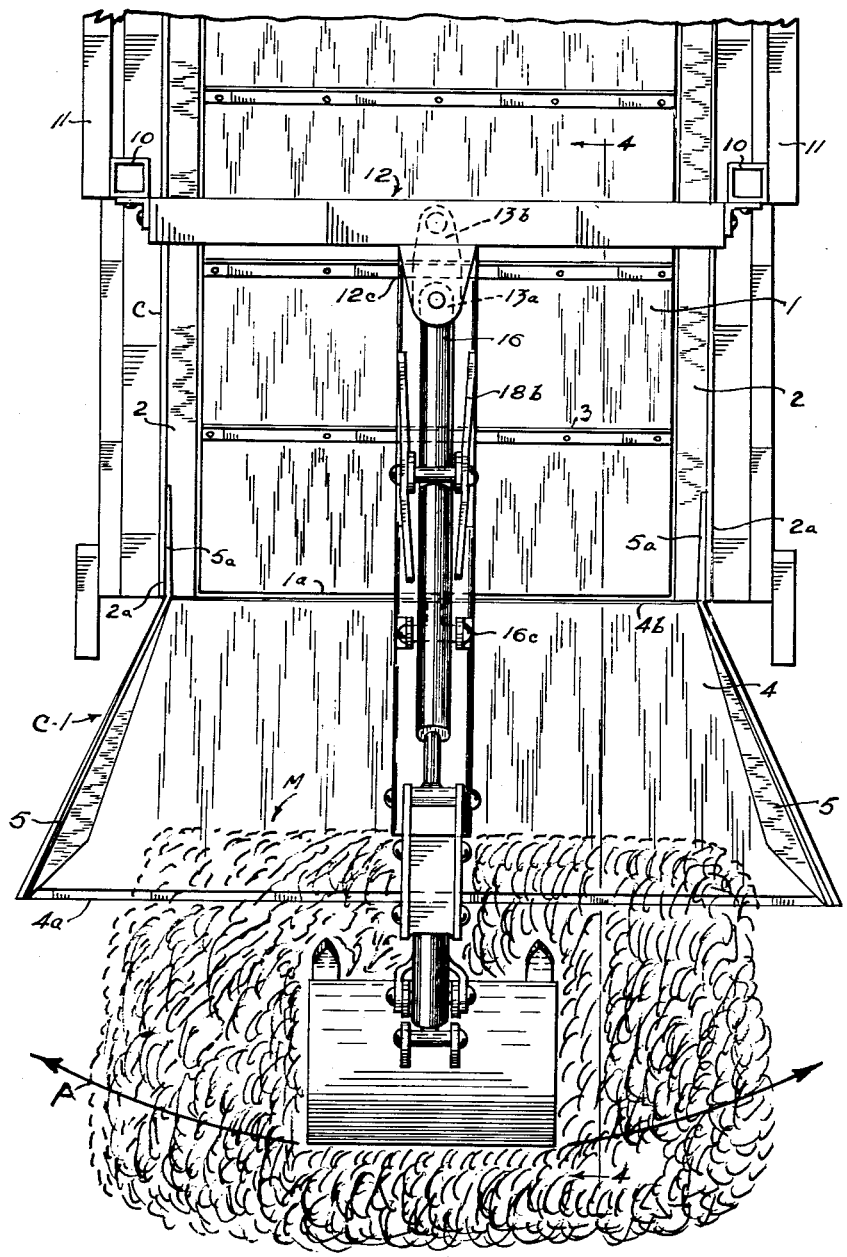
FIG. 6 is a fragmentary, enlarged, top plan of my machine, shown operating on a pile of manure.

As shown in the drawings, my machine is mounted on a suitable vehicle V, such as a four-wheel-drive automobile, commonly known as a "jeep," having a very powerful motor (not shown) adapted to propel the vehicle V and supply power, from suitable take-offs, for driving the elements of the machine. Suitably mounted on the vehicle V is the conventional beater (not shown) driven by the motor, and the conveyor C driven by the motor, for supplying the manure to the beater which breaks up, aerates and ejects the manure from the rear of the machine. The conveyor C (FIG. 6) has a smooth, inclined floor 1, side walls 2, and travelling bars 3 which are propelled along the floor 1 by suitable endless sprocket chains (not shown) by sprocket wheels (not shown) driven by the motor of the vehicle V. It is to be understood that the bars 3 move the manure deposited at the forward end of the conveyor C, upwardly to the beater (FIGS. 1 and 6).

I provide a chute C–1 which is removably connected to the forward end of the conveyor C. The chute C–1 has an inclined bottom 4 and flaring side walls 5. It is to be noted (FIG. 6) that the forward edge 4–a of the bottom 4 of the chute C–1 is considerably wider than the forward edge 1–a of the bottom 1 of the conveyor C, and that the rear edge 4–b of the bottom 4 of the chute C–1 is slightly narrower than the forward edge 1–a of the bottom 1 of the conveyor C. The rear ends of the walls 5 of the chute C–1 have rearwardly extending wings 5–a which are adapted to be embraced by the forward ends 2–a of the walls 2 of the conveyor C. The chute C–1 has means for removably attaching the chute C–1 to the conveyor C consisting of rearwardly extending tongues 6 fixed on the walls 5 of the chute C–1, respectively (FIGS. 1, 2 and 3). Each tongue 6 is received between one of the walls 2 and a pair of bars 7 carried by the wall 2. A bolt 8 passed between the bars 7 of each pair and through wall 2 and tongue 6 has a head 8–a bearing on the bars 7. The chute C–1 has a pair of adjustable legs 9 (FIG. 1) for holding the chute C–1 in operable position when it is not attached to the conveyor C. These legs 9 are mounted on the walls 5 of the chute C–1, respectively, by means of pins 9–a passed through holes in the upper ends of the legs 9 and walls 5 to hold the legs 9 in operative position. The legs 9 also have suitable holes in their lower ends through which the pins 9–a can be passed to hold the legs 9 up in inoperative position.

I will now describe the novel means which I provide whereby the manure is moved through the chute C–1 into the conveyor C.

Figure 5:
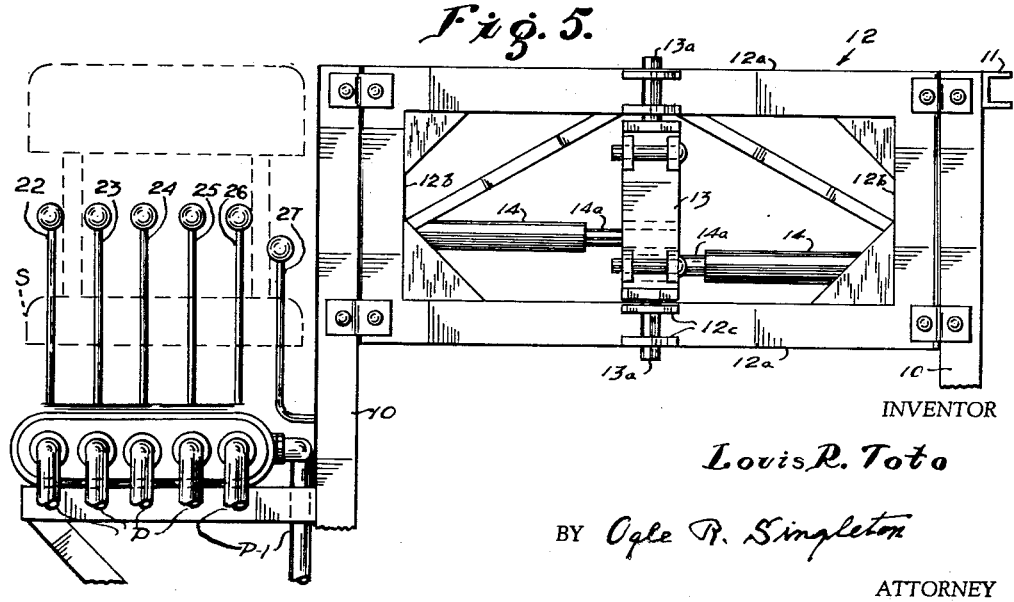
FIG. 5 is a vertical section on the line 5—5 of FIG. 4, in the direction of the arrows.

The conveyor C has mounted on its sides a pair of posts 10 immediately forwardly of the vehicle V (FIGS. 1 and 5) and suitably braced by struts 11 mounted on the vehicle V. Bolted to the forward faces of the posts 10, there is a rectangular frame 12 (FIG. 5) having upper and lower horizontal members 12–a and side vertical members 12–b. Each member 12–a has a bracket 12–c with vertically aligned journals 12–d. A U-shaped frame 13 has top and bottom vertical pintles 13–a received in journals 12–d, to mount the frame 13 for oscillation about a vertical axis. The frame 13 has three ears 13–b extending rearwardly. Two hydraulic cylinders 14 are pivotally mounted on the posts 10 and have pistons 14–a pivoted on the ears 13–b, adapted to oscillate the frame 13.

A boom 15 is pivotally mounted on the frame 13 on a horizontal pintle 15–a. A hydraulic cylinder 16 is pivotally mounted on the frame 13 on horizontal pintle 16–a and has a piston 16–b pivotally mounted on the boom 15 by a horizontal pintle 16–c.

From the foregoing, it will be understood that the boom 15 can be swung from side-to-side, over the chute C–1 and the conveyor C by movement of the frame 13 by action of the cylinders 14 and pistons 14–a (indicated by arc A in FIG. 6), and can be raised and lowered relative the frame 13 by action of the cylinder 16 and its piston 16–b.

A dipper stick 17 is pivotally mounted on the forward end of the boom 15 by a pintle 17–a and has a bell-crank 17–b rockable with the stick 17 about the pintle 17–a. A hydraulic cylinder 18 is pivotally mounted on brackets 18–a on the boom 15 with braces 18–b and has a piston 18–c pivoted on the bell-crank 17–b on a pintle 18–d.

A dipper 19 is pivotally mounted on the forward end of the stick 17 on a pintle 19–a, and has an outwardly projecting ear 19–b on its bottom. A hydraulic cylinder 20 is pivotally mounted on the bell-crank 17–b on a pintle 20–a and has a piston 20–b pivoted on the ear 19–b on a pintle 20–c. The dipper 19 is provided on its outer end with a series of tines 21.

The control valves (not shown) for pipes P for the hydraulic pressure for the cylinders 14, 16, 18 and 20 for operating their pistons 14–a, 16–b, 18–c and 20–b are manipulated by four levers 22, 23, 24 and 25 suitably disposed in front of a seat S for the operator of the machine, suitably mounted on the forward part of the vehicle V.

When the lever 22 is moved forwardly, hydraulic pressure in the cylinder 14 on the left side of the frame 12 (FIG. 5) projects the piston 14-a to swing the boom 15 toward the left. When lever 22 is moved rearwardly, hydraulic pressure in the cylinder 14 on the right side of the frame 12 (FIG. 5) projects the piston 14-a to swing the boom 15 toward the right.

When the lever 23 is moved forwardly, hydraulic pressure in the cylinder 16 retracts the piston 16-b to raise the boom 15, and, when the lever 23 is moved rearwardly, hydraulic pressure in the cylinder 16 projects the piston 16-b to lower the boom 15.

Figure 4:
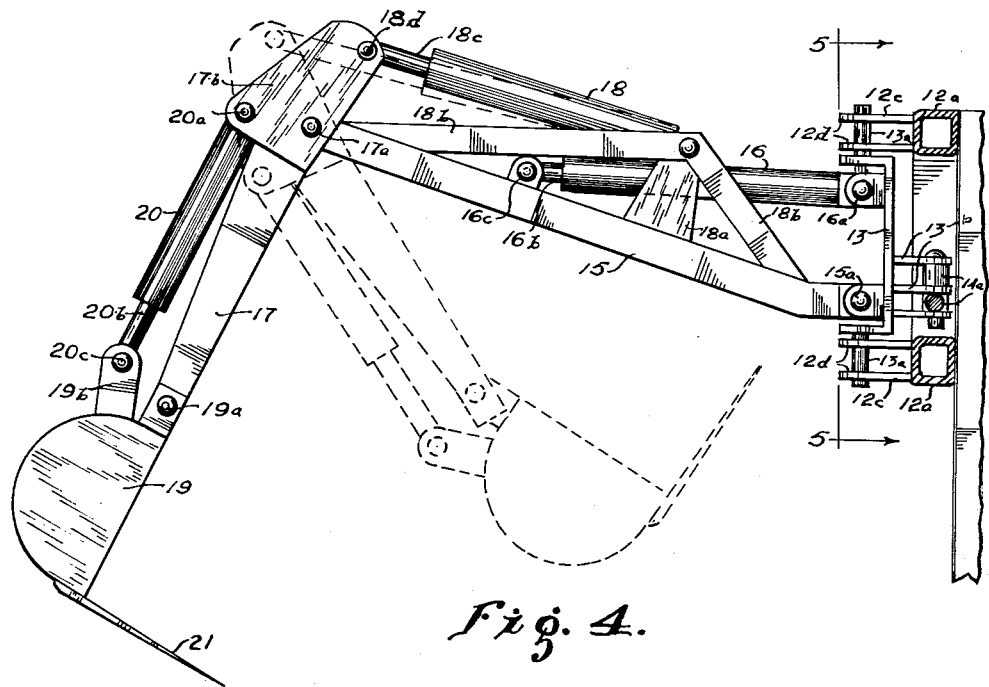
FIG. 4 is a vertical section on the line 4—4 of FIG. 6, in the direction of the arows.

When the lever 24 is moved forwardly, hydraulic pressure in the cylinder 18 retracts the piston 18-c to swing the dipper stick 17 outwardly (solid lines in FIG. 4), and, when the lever 24 is moved rearwardly, hydraulic pressure in the cylinder 18 projects the piston 18-c to swing the dipper stick 17 inwardly (broken lines in FIG. 4).

When the lever 25 is moved forwardly, hydraulic pressure in the cylinder 20 retracts the piston 20-b to swing the dipper 19 outwardly (solid lines in FIG. 4), and, when the lever 25 is moved rearwardly, hydraulic pressure in the cylinder 20 projects the piston 20-b to swing the dipper 19 inwardly (broken lines in FIG. 4).

A fifth lever 26 is provided, adjacent the other four levers, to control a valve for pipe P-1, for hydraulic pressure for power-steering the vehicle V. When this lever 26 is moved forwardly the vehicle is turned to the right and when moved rearwardly the vehicle V is turned to the left.

It is to be understood that the machine has a suitable compressor (not shown) driven by the motor of the vehicle, for supplying the hydraulic pressure.

A sixth lever 27 is provided, adjacent the other levers, for mechanical control of the clutch for starting and stopping the vehicle V.

Having described the structural details of my improved machine, I will now describe its use and operation.

The vehicle V is so manipulated (FIGS. 1 and 6) as to dispose the forward ends 2-a of the walls 2 of the conveyor C to embrace the wings 5-a of the walls 5 of the chute C-1, and the chute C-1 is attached to the conveyor C by the tongues 6 (FIGS. 1 and 6). The legs 9 are raised and fixed in inoperative position. The vehicle V is then moved forwardly to insert the forward edge 4-a of the chute C-1 into the pile of manure M (FIG. 1). The operator applies power to energize the beater and the conveyor C. He then moves the boom 15 and dipper stick 17 to dispose the dipper 19 over the top of the pile of manure M, with its tines disposed so as to bite into the pile when the dipper is lowered. It is obvious (FIG. 1) that when the dipper 19 is moved downwardly and rearwardly the manure M is moved from the pile into the chute C-1 and thence onto the conveyor C to be carried to and operated upon by the beater. It is also obvious that as the pile is eroded by the process, the vehicle V can be moved forwardly to continue the operation until all of the manure M is moved to the beater.

Having described my invention, what I claim is:

In a composting machine for treating manure, the combination of a vehicle; a motor mounted in said vehicle; means for driving said vehicle, driven by said motor; a conveyor mounted on said vehicle, said conveyor having a smooth inclined floor, a pair of upstanding side walls, traveling bars slidably disposed on said floor between said walls, and endless chains on which said bars are mounted, said chains being driven by said motor, the lower ends of said inclined floor and said side walls being spaced above the ground on which said vehicle rests; a chute having an inclined bottom and flaring side walls with rearwardly extending wings, the upper end of said bottom of said chute registering with said floor of said conveyor, and said wings being embraced by said side walls of said conveyor, the lower ends of said bottom and said side walls of said chute resting upon said ground; a pair of tongues mounted on said side walls of said chute, respectively; means for removably attaching said tongues to said side walls of said conveyor, respectively, consisting of a pair of vertical bars carried by each of said side walls of said conveyor, a pair of bolts passed between the bars of each pair of said vertical bars, respectively, and through said walls of said conveyor and said tongues, respectively, each of said bolts having a head bearing on said bars; and a pair of legs adjustably mounted on said side walls of said chute, respectively, for supporting said chute.

References Cited in the file of this patent

UNITED STATES PATENTS

| | | |
|---|---|---|
| 1,193,581 | Mansbendel | Aug. 8, 1916 |
| 2,660,439 | Scranton | Nov. 24, 1953 |
| 2,734,803 | Ruskin | Feb. 14, 1956 |
| 2,784,855 | Acker | Mar. 12, 1957 |
| 2,834,489 | Davis | May 13, 1958 |

FOREIGN PATENTS

| | | |
|---|---|---|
| 1,128,331 | France | Jan. 4, 1957 |